United States Patent [19]

Santen

[11] 4,362,554

[45] Dec. 7, 1982

[54] METHOD AND APPARATUS FOR MANUFACTURING SPONGE IRON

[75] Inventor: Sven Santen, Hofors, Sweden

[73] Assignee: SKF Steel Engineering Aktiebolag, Hofors, Sweden

[21] Appl. No.: 241,396

[22] Filed: Mar. 6, 1981

[51] Int. Cl.³ .......................... C22B 13/02; F27B 1/08
[52] U.S. Cl. .......................................... 75/11; 48/65; 48/202; 48/210; 75/35; 266/156; 266/140; 373/22
[58] Field of Search ........................ 75/34, 35, 11 R; 48/202, 210, 65; 266/140, 156; 373/18, 22, 24

[56] References Cited

U.S. PATENT DOCUMENTS 3,853,538 12/1974 Nemeth .................................... 75/35
4,072,502 2/1978 Santen et al. ...................... 373/18X
4,141,694 2/1979 Camacho ................................ 48/65

Primary Examiner—M. J. Andrews
Attorney, Agent, or Firm—Brumbaugh, Graves, Donohue & Raymond

[57] ABSTRACT

Disclosed are a method and apparatus for manufacturing sponge iron by the continuous reduction of iron oxides in a shaft utilizing recirculation gases. Reaction gas is removed from the shaft furnace, substantially cleaned of all $CO_2$ and $H_2O$, and then divided into at least two flow portions one of which is passed to a gas generator comprising a plasma burner. A reducing agent such as pit coal is injected together with an oxidant into the hot gas from the plasma burner so as to form a gas mixture comprised primarily of CO and $H_2$, which gas mixture is then mixed with the other flow portion of the cleaned reaction gas in such proportion that the temperature of the resulting reduction gas is suitable for the reduction of iron oxides in the shaft furnace.

19 Claims, 1 Drawing Figure

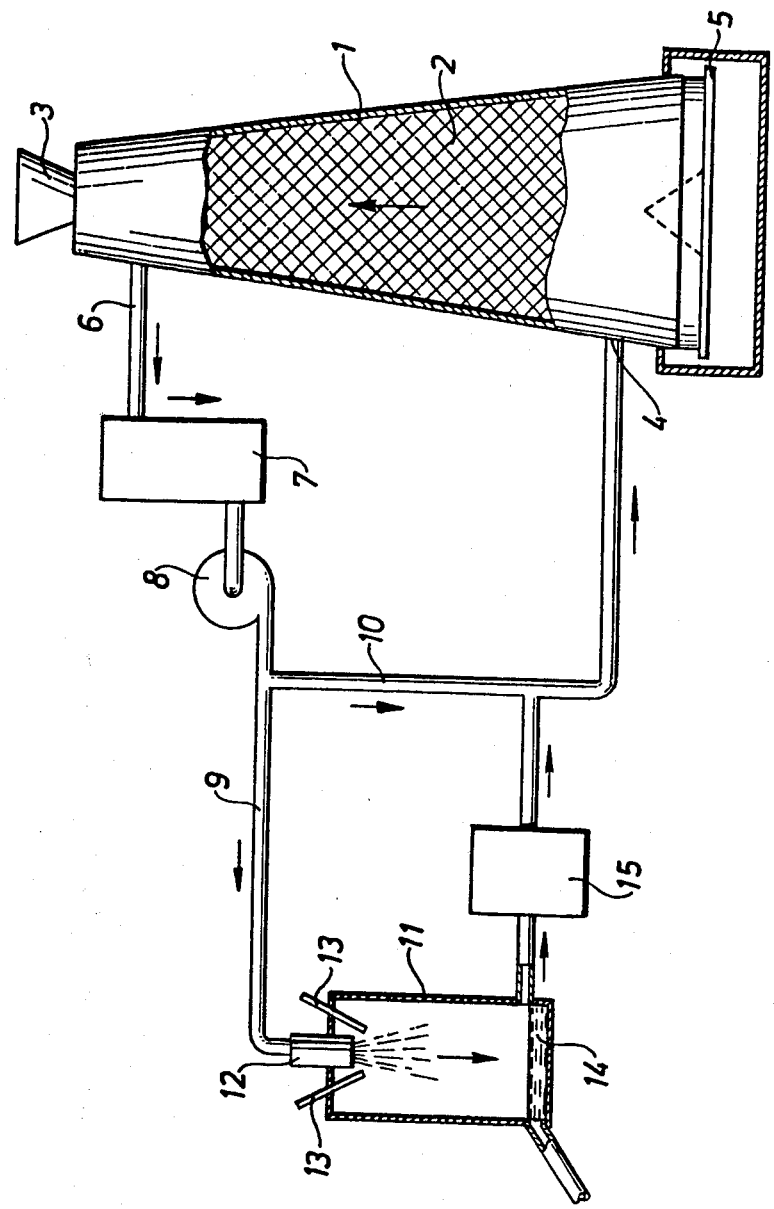

METHOD AND APPARATUS FOR MANUFACTURING SPONGE IRON

BACKGROUND OF THE INVENTION

Despite the fact that pit coal is one of our most plentiful and cheapest energy producing raw materials, it has so far been used only to an extremely limited extent as a reducing agent in the manufacture of sponge iron. This situation persists despite the favorable relationship between price and energy content with respect to pit coal.

Conventional processes for the manufacture of sponge iron in which coal is used as a reducing agent are primarily the following:

a. The rotary furnace method in which pit coal is used together with the ore to be reduced, in an inclined rotary furnace. The difficulty with this method is that, mainly due to kinetic energy, it is necessary to work with relatively high temperatures, preferably 1000° C., which causes considerable problems with clogging and the accumulation of material in the reaction chamber.

b. The use of a shaft furnace combined with equipment for gassification of coal, which is based on partial combustion. The drawback with this known method is primarily the extremely high investment cost for the gassification equipment and also the exceptionally high energy consumption.

c. The method, such as is disclosed in Swedish Pat. No. 73 04 322-5, of directly gassifying coal in solid form using a plasma generator. The drawbacks of this method are that the supply of coal must be extremely accurately adjusted and for some grades of coal there are problems in handling the ash. Moreover, the gas produced has a hydrogen content which is lower than the ideal for reduction purposes.

BRIEF SUMMARY OF THE INVENTION

It has now been found that the above difficulties and drawbacks with the known processes can be substantially eliminated according to the present invention. This invention is directed to a method and apparatus for manufacturing sponge iron by the continuous reduction of iron oxides in a shaft furnace. A reduction gas is passed counter-current to the iron oxides and consists primarily of CO and $H_2$, the reduction gas being produced from recirculation gas, i.e. reaction gas leaving the shaft furnace as well as an extra gas produced from solid reducing agent such as coal, preferably pit coal, with the help of a plasma generator. The recirculation gas is first substantially cleaned from $CO_2$ and $H_2O$, whereupon the gas thus cleaned is divided into two portions, one of which is passed to a plasma generator. The reducing agent, together with water, is injected into the hot gas flow leaving the plasma generator so that the water is caused to react with the reducing agent to form a mixture of primarily CO and $H_2$. The temperature level of the gas produced is kept within such a range that ash included in the solid reducing agent forms a slag. The hot CO-$H_2$ mixture leaving the gas generator is mixed with at least some of the other flow portion of the cleaned recirculation gas in such proportion that the temperature of the final gas mixture is suitable for the reduction process.

According to one embodiment of the invention, the temperature level of the gas produced in the gas generating shaft is adjusted to a temperature range of 1300°–1500° C. It is also preferable, before the final gas mixture is provided to the lower part of the shaft furnace, for its temperature to be brought to within the range 700°–1000° C. by mixing it with the second flow portion.

According to another embodiment of the invention the recirculation gas is cleaned in a gas wash until its content of $CO_2$ is preferably below 2%.

The invention is also directed to an apparatus for the manufacture of sponge iron comprising a generating system for reduction gas which includes a cleaning means for the reaction gas leaving the reaction chamber and a gas-generating shaft connected thereto for receiving a portion of the cleaned reduction gas thus obtained. The gas-generating shaft comprises a plasma generator and supply means for the controlled introduction of reducing agent and water into the plasma gas produced therein. An adjustable mixer is provided downstream of the gas-generator shaft to mix the portion of the reduction gas from the shaft with a second, untreated portion of the cleaned reaction gas. Also provided are blowing means in the lower section of the reaction chamber for the introduction of the final gas mixture thus obtained.

BRIEF DESCRIPTION OF THE DRAWING

For a better understanding of the invention, reference may be made to the following description of an exemplary embodiment taken in conjunction with the single FIGURE of the accompanying drawing which illustrates diagrammatically a mode of carrying out the invention.

DESCRIPTION OF THE PREFERRED EMBODIMENT

The reduction of chunks of iron oxide is performed in a reduction shaft 1. The chunks of iron oxide 2 are fed through a sluice valve 3 into the shaft 1 and treated by a counter-current flow of a hot reduction gas consisting primarily of carbon monoxide and hydrogen gas introduced at the lower section 4 of the shaft 1. The sponge iron product is removed through an outlet 5 in the bottom 4 of the shaft 1. The reduction gas, 30% to 50% of which has been reacted, is removed from the upper part of the shaft 1 through an outlet 6.

The gas thus removed from the shaft 1, besides containing from 50% to 70% unreacted CO and $H_2$, also contains the reaction products $CO_2$ and $H_2O$. Since this gas still contains relatively high percentages of CO and $H_2$, it is re-usable in the process. However, to enable it to be re-used as reduction gas, the content of $CO_2$ and $H_2O$ must be reduced to less than 5%. This is achieved by allowing the gas to pass through a wash ($CO_2$/$H_2O$ wash) 7. When the gas passes through this wash, not only is it freed from the reaction products $CO_2$ and $H_2O$, but the actual washing process enables balancing of the gas quantity so that flaring of the gas can be avoided. The wash 7 may contain mono-ethanol amine, for instance, as active substance and the content of $CO_2$ in the gas can be suitably reduced to below 2% upon passage through the wash.

After the wash 7 the gas passes a compressor 8 to achieve the pressure increase necessary for the process and is then divided into at least two flow portions 9, 10. The flow portion 9, which is at room temperature, is passed into a gas generator 11 where the necessary extra gas is generated from a solid reducing agent, preferably coal, and water. The gas flow 9 is used as plasma gas in a gas generator 11 and the quantity of energy necessary for the gas regenerating process is supplied in a plasma burner 12. The main source of energy, which is coal dust, is treated with an oxidant, preferably water, and is supplied to the gas generator 11 through jets 13 so that it penetrates the hot gas flow leaving the plasma burner 12 in such a manner that coal dust and oxidant are brought to react and form CO and $H_2$. In order to ensure a sufficient degree of reaction as well as proper handling characteristics, it is preferred that the coal dust have a particle size below 20 mesh and preferably below 100 mesh.

The supply of energy in the gas generator 11 is regulated so that the ash existing in the coal dust is melted to a slag 14 which can be removed from the lower part of the gas generator 11 in liquid or solid form. Due to the composition of the ash, the temperature is preferably selected to be within the range 1300°–1500° C.

The reduction gas produced in the apparatus, besides containing CO and $H_2$, may also contain sulphur included in the coal. This intermediate gas mixture is therefore caused to pass a sulphur filter 15 (e.g. a dolomite filter) where the sulphur content is reduced to an acceptable level for the sponge iron process, preferably below 75 ppm.

The gas leaving the sulphur filter 15 is at a temperature substantially in excess of that required for the sponge iron process and the temperature is therefore lowered by mixing in a suitable portion of the cold, washed gas in the flow portion 10 to yield a temperature suitable for the process—e.g. 750°–1000° C., preferably 825° C.

Substantial technical advantages are obtained utilizing the method and apparatus according to the invention. In this regard, the gas generation can take place at a temperature such that the ash forms slag which is easy to handle and which can be tapped off without causing clogging problems in the process. The hydrogen content in the reduction gas can be adjusted to an amount suitable for the reduction process by means of the washing process and subsequent injection of water into the gas generator. Furthermore the combination of gas washing and gas generation at increased temperatures offers superior possibilities of balancing the quantity of gas in the system and regulating the reduction temperature. At the same time, energy efficiency is achieved since the energy supplied by the plasma-generator is substantially completely used in the process (i.e. temperature adjustment is accomplished by adding cooler recycled reduction gas rather than by removing heat from the system).

In experiments on a test scale the following consumption values per ton produced sponge iron were achieved:

Electric energy: 820 kWh
Coal pit powder: 172 kg

Furthermore, the process according to the invention is much simpler to regulate. Simpler and more efficient regulation of the entire process is achieved in the generation of the plasma gas by pre-mixing coal dust and added water in the correct proportions, preferably in stoichiometric proportions. Due to this pre-mixing of coal dust and water, the mixture is also easier to inject in the form of a coal-in-water emulsion.

Should difficulties arise in binding the ash from the solid reducing agent in a slag phase, additives affecting the properties (e.g. melting point, sulphur absorption, etc.) of the slag may be used, such as alkali compounds and chalk. These additives are preferably mixed with the solid reducing agent. Suitable gel-formers may be added in order to stabilize the coal-water mixture and oxygen may be supplied to the gas generator 11 in the form of oxygen gas instead of water.

I claim:

1. A method of manufacturing sponge iron by the continuous reduction of iron oxides in a shaft furnace comprising the steps of:
   (1) removing the reaction gas from a shaft furnace;
   (2) removing from said reaction gas substantially all $CO_2$ and $H_2O$;
   (3) dividing the reaction gas into at least two flow portions;
   (4) passing one of said flow portions to a gas generator comprising a plasma burner and means for injecting solid reducing agent and oxidant, and heating said reaction gas by said plasma burner and injecting into the heated gas solid reducing agent and oxidant so as to form an intermediate gas mixture comprised primarily of CO and $H_2$;
   (5) maintaining said intermediate gas mixture at a temperature such that ash contained within the solid reducing agent forms a slag;
   (6) mixing said intermediate gas with at least one of said other flow portions in such proportion that the temperature of the resulting reduction gas is suitable for the reduction of iron oxides in a shaft furnace;
   (7) injecting said reduction gas into the lower portion of a shaft furnace and passing said reduction gas upwardly through said shaft furnace so as to reduce iron oxides contained in said furnace; and
   (8) removing from said furnace the reduced iron.

2. A method according to claim 1 wherein said oxidant is water or oxygen.

3. A method according to claim 2 including the step of maintaining the intermediate gas mixture at a temperature between about 1300° and 1500° C.

4. A method according to claim 3 wherein said intermediate gas is mixed with said at least one other flow portion in such a proportion that the temperature of the resulting reduction gas prior to injection into the shaft furnace is between about 700° and 1000° C.

5. A method according to claim 4 wherein the temperature of the reduction gas prior to injection into the shaft furnace is approximately 825° C.

6. A method according to claim 1 wherein the $CO_2$ and $H_2O$ is removed from the reaction gas by means of a gas wash until the content of $CO_2$ is less than about 2%.

7. A method according to any one of claims 1–6 wherein said reducing agent is coal.

8. A method according to claim 7 wherein said reducing agent is coal dust.

9. A method according to claim 8 wherein said reducing agent is pit coal dust.

10. A method according to claim 8 wherein said reducing agent is coal dust having a particle size below 20 mesh.

11. A method according to claim 10 wherein said reducing agent is coal dust having a particle size below 100 mesh.

12. A method according to any one of claims 1–6 including the step of passing said intermediate gas mixture through a sulphur filter.

13. Apparatus for the manufacture of sponge iron by the continuous reduction of iron oxides comprising:
  (1) a shaft furnace for the reaction of iron oxides by a reduction gas comprised primarily of CO and $H_2$;
  (2) means connected to the upper portion of the shaft furnace for removing reaction gas from the furnace;
  (3) cleaning means for the removal of $CO_2$ from said reaction gas;
  (4) means for separating the cleaned reaction gas into at least two flow portions;
  (5) a gas generator for receiving at least one of said flow portions, said gas generator comprising a plasma burner and means for injecting solid reducing agent and oxidant into the gas heated by said plasma burner thereby to produce an intermediate gas mixture comprised primarily of CO and $H_2$;
  (6) mixing means for the controlled mixing of said intermediate gas mixture with at least one of the other flow portions of the reaction gas thereby to obtain a reduction gas; and
  (7) means for injecting said reduction gas into the lower portion of the shaft furnace.

14. Apparatus according to claim 13 wherein the cleaning means comprises a $CO_2$ wash.

15. Apparatus according to claim 14 wherein the $CO_2$ wash contains mono-ethanol amine as the active agent.

16. Apparatus according to claim 13 including a compressor located between the cleaning means and the means for separating the cleaned reaction gas.

17. Apparatus according to any one of claims 13–16 wherein said gas generator is provided with means for removing slag.

18. Apparatus according to any one of claims 13–16 including a sulphur filter between the gas generator and the mixing means.

19. Apparatus according to any one of claims 13–16 wherein the means for injecting solid reducing agent and oxidant has an injection area immediately in front of the plasma burner.

* * * * *